Patented Sept. 30, 1941

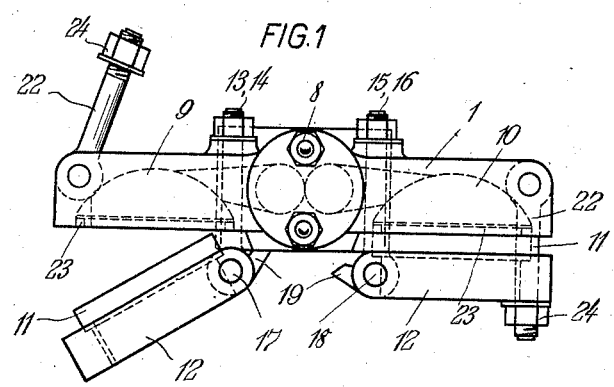
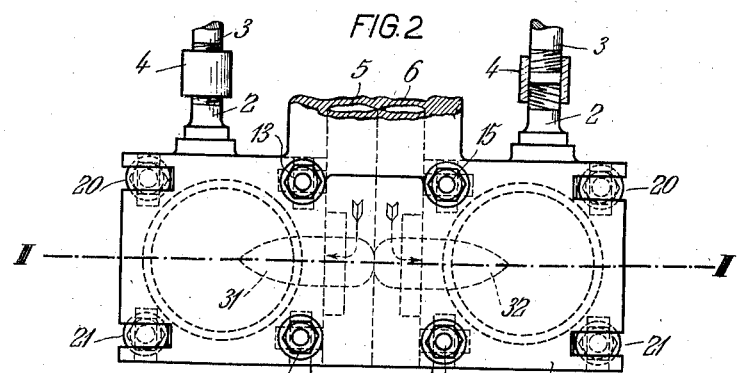
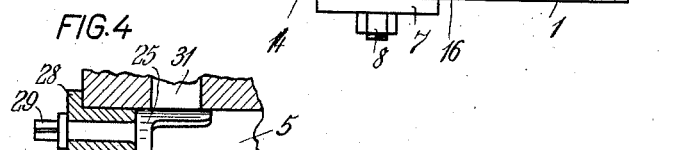
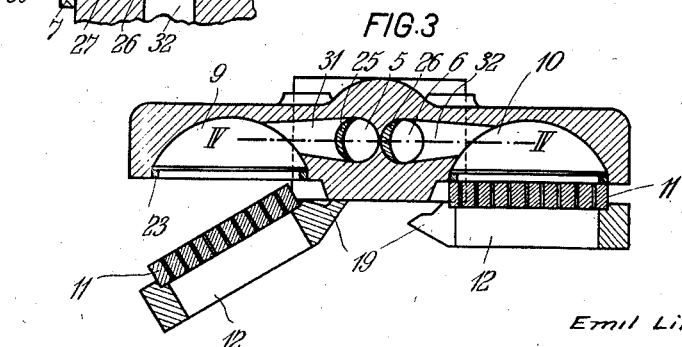

2,257,695

UNITED STATES PATENT OFFICE 2,257,695

WORM PRESS FOR THE MANUFACTURE OF ALIMENTARY PASTES

Emil Lihotzky, Plattling, Bavaria, Germany

Application June 4, 1940, Serial No. 338,813
In Switzerland March 23, 1939

3 Claims. (Cl. 107—14)

This invention relates to a worm press for the manufacture of alimentary pastes and the like.

Worm presses of the type referred to usually have one or more extrusion openings and mould plates applied on the extrusion face of the openings, for extruding the dough therethrough.

It is the object of the present invention to provide means by which the mould plates can be readily and quickly attached and exchanged, while ensuring tight fitting without leakage between the adjacent faces of the extrusion opening and mould plate.

With this and further objects in view, as may become apparent from the within disclosures, the invention consists not only in the structures herein pointed out and illustrated by the drawing, but includes further structures coming within the scope of what hereinafter may be claimed.

The character of the invention, however, may be best understood by reference to certain of its structural forms, as illustrated by the accompanying drawing in which:

Fig. 1 is a front view of a casing adapted for connection to the worm press.

Fig. 2 is a plan view of Fig. 1.

Fig. 3 is a section on line III—III of Fig. 2.

Fig. 4 is a fragmentary section on line IV—IV of Fig. 3, showing the device for controlling the feed to the press chambers.

Similar characters of reference denote similar parts in the different figures.

Briefly stated, the present invention consists in that my novel device is provided with a swingable ring member in which the mould plate is seated and by which it can be tightly pressed against the discharge opening of the worm press.

Advantageously, said ring is provided to swing downwards and adapted to be tightened by means of rapid tightening means. To this end, pivoted screws may be used.

According to another important feature of the invention, a separate casing is provided to be applied to the delivery side of the worm or screw press and the swingable ring member is pivoted to said separate casing. This offers the advantage that ordinary worm presses may be used to which my novel mould plate device can be fitted as a separate attachment.

According to another important feature of the invention means are provided for controlling the feed to the dough chambers, so as to permit exchange of one mould plate while the other mould plate remains in operation.

In the embodiment illustrated in the drawing, a separate casing 1 is provided to be connected to the worm or screw press (not shown) by means of tension bolts or studs consisting of portions 2 and 3 interconnected by a threaded sleeve 4, as best seen in Fig. 2, for variation of the total length of the bolts and adaptation to the press.

The casing 1 is formed with a pair of parallel longitudinal channels 5, 6 extending throughout the casing and being closed at their front end by a detachable cover 7 which is secured to the casing by screws 8. On removal of the cover 7 the channels 5 and 6 may be readily cleaned.

Through cross channels 31 and 32 the channels 5 and 6 communicate with dough spaces or press chambers 9 and 10 the open sides of which are closed by mould plates 11, 11, detachably engaged in supporting rings 12. The rings 12 are pivotally mounted on the casing 1 by means of screw eyelets 13, 14, 15, 16, secured to the casing, and pivot pins 17, 18, extending through the eyelets of the screws 13, 14, or 15, 16, resp., and through counter eyelets in the pivoted rings 12. Noses 19 at the rear or inner ends of the rings 12 are adapted to limit the downward swinging motion of the rings by striking against the casing, and slots 20 on the front or outer sides of the rings are provided for the reception of screw eyelets 22 which are pivotally mounted in the casing. Moreover, packing rings 23 are provided in each press chamber, for cooperation with the margin of the mould plates 11.

In order to exchange a mould plate 11, the nuts 24 of the pivoted screws 22 are loosened to permit their lateral swinging out, as shown on the left hand side of Fig. 1. Now, the supporting ring 12 owing to its weight swings downwards around its pin 17, or 18, this motion being limited by engagement of the nose 19 with the casing, as shown on the left hand side of Fig. 3, and the mould plate 11 may be taken off and replaced by another one, whereupon the ring 12 may be swung back to the casing and secured thereto by application of the pivoted screws 22 and tightening of their nuts 24, thus tightly forcing the mould plate 11 against the packing ring 23. It will be appreciated that this construction ensures a reliable and tight seat for the mould plates and permits ready removal and exchange thereof.

The resistance offered by the mould plate against the passage of the dough varies with different mould plates. Therefore, I contemplate the provision of means for balancing such variations of the resistance, to ensure reliable working of the press. To this end, I provide valve means in the channels 5 and 6 for controlling the delivery of the dough mass to the press chambers. For instance, slide valves, such as, round slide valves, may be used as control means, so as to permit cutting off either press chamber from its channel 5 or 6, resp., thus interrupting the flow of the dough mass to this chamber, while the other chamber continues to be supplied. In this manner, it is possible to exchange the mould plate of either press chamber 9 or 10, and yet to keep the other press chamber in operation.

While various means may be used for this purpose, I have shown a preferred embodiment of the control means in Figs. 3 and 4, in which a cylindrical slide valve 25, or 26, resp., having a blade or shovel shaped valve body, is revolubly mounted in its channel 5, or 6, resp. Each slide 25 or 26 is operatively connected to a shaft 27, or 28, resp., which extends through the closure plate 7 and is formed at its end with a square head portion 29, or 30, resp., whereby its slide valve 25 or 26 may be adjusted as desired, by means of a wrench, and placed before its inlet opening, as indicated at 31, for closing the same, or removed therefrom to lay bare the inlet opening to the desired extent, as indicated at 32.

The method and apparatus of the present invention have been described in detail with reference to specific embodiments. It is to be understood, however, that the invention is not limited by such specific reference but is broader in scope and capable of other embodiments than those specifically described and illustrated in the drawing.

It is also to be understood that the following claims are intended to cover all of the generic and specific features of the invention herein described, and all statements of the scope of the invention which, as a matter of language, might be said to fall therebetween.

I claim:

1. In a device of the type described, a separate casing adapted to be mounted at the delivery end of a screw press and including a pair of dough chambers formed with a pair of dough extrusion openings, a central duct for establishing a dough feeding communication from the delivery end of the press to the separate casing, a pair of connecting channels bent at right angles for connecting said dough chambers to said central duct, a control valve in the bend of each connecting channel, at least one pair of screw eyelets extending through said casing in the dough feeding direction and at points on the inner sides of the extrusion openings, a pair of mould plates for cooperation with said openings, a pair of supporting rings pivoted on said screw eyelets and forming seats for said mould plates, and means for pressing said supporting rings with their mould plates tightly against their associated extrusion openings.

2. In a device of the type described, a separate casing adapted to be mounted at the delivery end of a screw press and including a pair of dough chambers formed with a pair of dough extrusion openings, a central duct for establishing a dough feeding communication from the delivery end of the press to the separate casing, a pair of connecting channels extending through the casing and communicating with said central duct, cross channels from said connecting channels to said dough chambers, a detachable cover on the front side of said casing for closing said through-going connecting channels, at least one pair of screw eyelets extending through said casing in the dough feeding direction and at points on the inner sides of the extrusion openings, a pair of mould plates for cooperation with said openings, a pair of supporting rings pivoted on said screw eyelets and forming seats for said mould plates, and means for pressing said supporting rings with their mould plates tightly against their associated extrusion openings.

3. In a device of the type described, a separate casing adapted to be mounted at the delivery end of a screw press and including a pair of dough chambers formed with a pair of dough extrusion openings, a central duct for establishing a dough feeding communication from the delivery end of the press to the separate casing, a pair of connecting channels extending through the casing and communicating with said central duct, cross channels from said connecting channels to said dough chambers, a detachable cover on the front side of said casing for closing said through-going connecting channels, a rotary slide valve including a shaft in each connecting channel adapted to close said cross channel by operation of its shaft which extends through said cover, at least one pair of screw eyelets extending through said casing in the dough feeding direction and at points on the inner sides of the extrusion openings, a pair of mould plates for cooperation with said openings, a pair of supporting rings pivoted on said screw eyelets and forming seats for said mould plates, and means for pressing said supporting rings with their mould plates tightly against their associated extrusion openings.

EMIL LIHOTZKY.